United States Patent
Khayat et al.

(10) Patent No.: US 8,217,636 B2
(45) Date of Patent: Jul. 10, 2012

(54) CIRCUIT AND METHOD FOR REDUCING OUTPUT VOLTAGE TRANSIENTS IN A VOLTAGE MODE BUCK CONVERTER

(75) Inventors: Joseph Maurice Khayat, Bedford, NH (US); Jin-Biao Huang, Amherst, NH (US); Brian Thomas Lynch, Brookline, NH (US)

(73) Assignee: Texas Instruments Incorporated, Dallas, TX (US)

( * ) Notice: Subject to any disclaimer, the term of this patent is extended or adjusted under 35 U.S.C. 154(b) by 983 days.

(21) Appl. No.: 12/199,012

(22) Filed: Aug. 27, 2008

(65) Prior Publication Data

US 2010/0052628 A1 Mar. 4, 2010

(51) Int. Cl.
*G05F 1/00* (2006.01)
(52) U.S. Cl. ............................... 323/282; 323/284
(58) Field of Classification Search .................. 323/234, 323/282, 284
See application file for complete search history.

(56) References Cited

U.S. PATENT DOCUMENTS

| 7,245,113 B2 * | 7/2007 | Chen et al. | 323/271 |
| 7,518,885 B2 * | 4/2009 | Baurle et al. | 363/16 |
| 2004/0095266 A1 * | 5/2004 | Kernahan et al. | 341/165 |
| 2008/0164853 A1 * | 7/2008 | Hack et al. | 323/205 |
| 2009/0153124 A1 * | 6/2009 | Ishii | 323/290 |
| 2009/0200995 A1 * | 8/2009 | Tran et al. | 323/222 |

\* cited by examiner

*Primary Examiner* — Adolf Berhane
*Assistant Examiner* — Emily Pham
(74) *Attorney, Agent, or Firm* — William B. Kempler; Wade J. Brady, III; Frederick J. Telecky, Jr.

(57) ABSTRACT

A voltage control mode buck converter circuit includes a feedback amplifier providing a comparison signal and a storage circuit in communication with the comparison signal to store a storage comparison signal value. The storage circuit stores the operating conditions for the circuit during normal continuous conduction mode operation in response to sensing a load drop for the circuit. A switching circuit locks the feedback amplifier into the stored operating parameters while the converter circuit operates in non-continuous conduction mode. When the circuit transitions back into the continuous conduction operation mode, the feedback amplifier is already operating at conditions that are compatible with a continuous conduction operation mode.

19 Claims, 2 Drawing Sheets

CIRCUIT AND METHOD FOR REDUCING OUTPUT VOLTAGE TRANSIENTS IN A VOLTAGE MODE BUCK CONVERTER

TECHNICAL FIELD

This invention relates generally to converter circuits and more specifically to mode changes for voltage control mode buck converter circuits.

BACKGROUND

Converter circuits are generally known in the art. For example, DC to DC converter circuits accept a DC voltage input and in turn provide an output of a different DC voltage. One type of DC to DC converter circuit is a buck converter circuit, which typically receives a higher voltage signal and outputs a lower voltage signal. Buck converter circuits generally operate in one of two modes, a continuous mode and a non-continuous mode. A buck converter circuit typically transitions from a continuous mode to a non-continuous mode to improve efficiency. For example, when the output load condition for the converter circuit decreases significantly such that less input energy is needed to maintain a regulated DC output, a buck converter circuit may change from the continuous mode to a non-continuous mode to reduce switching losses associated with continuous mode. In the non-continuous mode, the circuit will then only occasionally provide energy or burst energy to provide the necessary output when the output load drops.

Transitions between the continuous and non-continuous mode, however, often cause output voltage transients that are undesirable. These output voltage transients are different from those induced in a converter running in one mode all the time. For instance, a converter operating in continuous mode remains in steady state so long as there are not any output load step changes, whereby steady state results in a well regulated output voltage. Load step changes while maintaining continuous mode are often designed around and minimized using established methods in power supply design. When a converter, however, changes modes, output transients can become unpredictable due to a control loop change. For example, a converter switching from an efficiency savings non-continuous mode to a continuous mode in response to an increase in output load, can exhibit a significantly larger output voltage transient, overshoot or undershoot, than a converter incurring a load step while during a continuous operation. In this case, common power supply design techniques that handle load transients in a single continuous mode do not work for situations involving mode transition.

Current mode control converters that use transconductance output error amplifiers have implemented methods to minimize output voltage disturbance upon mode change. These error amplifier outputs reflect load current during continuous mode. In non-continuous control, some techniques have been implemented that condition the output of the error amplifier in anticipation of mode change back to continuous control. Voltage mode control converters that use voltage error amplifiers exhibit a different and unique challenge from current mode control converters. The output voltage of the error amplifier in a voltage mode converter reflects the duty cycle, or output voltage to input voltage conversion ratio, during the continuous mode. Often the error amplifier is not used for control during non-continuous mode. Upon engaging it back into the control loop when transitioning from non-continuous to continuous, its output voltage could exhibit significant change leading to significant converter output transient. A new method is herein described to address this problem and minimize the converter output voltage transient.

SUMMARY

Generally speaking, pursuant to these various embodiments, a voltage control mode buck converter circuit includes a feedback amplifier configured to provide a comparison signal by comparing a feedback signal responsive to an output voltage for the voltage control mode buck converter circuit to a reference signal when in a continuous conduction operation mode of the voltage control mode buck converter circuit. The circuit also includes a storage circuit in communication with the comparison signal that is configured to store a storage comparison signal value responsive to the comparison signal in association with an operation mode change for the buck converter circuit. The operation mode change occurs in association with the detection of a load change on the output of the voltage control mode buck converter circuit. The circuit also includes a switching circuit configured to switch the feedback amplifier to be in communication with the signal responsive to the stored comparison signal values. Switching occurs in association with detection of the load change. In operation, the voltage mode buck converter circuit stores the operating conditions for the circuit during normal continuous conduction mode operation in response to sensing a load drop for the circuit. The feedback amplifier can then lock into the stored operating parameters while the converter circuit operates in non-continuous conduction mode. When the circuit transitions back into the continuous conduction operation mode, the feedback amplifier is already operating at conditions that are compatible with a continuous conduction operation mode.

By another approach, a voltage control mode buck converter circuit comprises a feedback line in communication with an output voltage for the voltage control mode buck converter circuit. The voltage control mode buck converter circuit also includes a first amplifier configured to be in communication with the feedback line and a reference voltage during a continuous conduction operation mode for the voltage control mode buck converter circuit, the first amplifier configured to provide a comparison signal to a comparison line in response to a feedback signal on the feedback line and the reference voltage, and a storage circuit in communication with the comparison signal, the storage circuit configured to store a comparison signal value in association with the continuous conduction operation mode prior to a load current drop event. The first amplifier in this approach is configured to be in communication with a signal corresponding to the comparison signal value after a mode transition from the continuous conduction operation mode to a non-continuous conduction operation mode in response to the load current drop event.

By yet another approach, a voltage control mode buck converter circuit comprises a feedback line in communication with an output voltage for the voltage control mode buck converter circuit and a first amplifier configured to be in communication with the feedback line and a reference voltage during a continuous conduction operation mode for the voltage control mode buck converter circuit, the first amplifier configured to provide a comparison signal to a comparison line in response to a feedback signal on the feedback line and the reference voltage. The voltage control mode buck converter circuit also includes a switching circuit configured to switch the first amplifier to be in unity gain and in communication with a signal responsive to the comparison signal, the switching circuit configured to switch during a mode transition from the continuous conduction operation mode to a non-continuous conduction operation mode in response to a load current drop event.

A method of reducing output voltage transients in a voltage mode buck converter circuit includes sensing and storing the operating conditions for the circuit prior to a mode change and locking the circuit to those conditions upon return to the original operational mode to reduce transients in restoring a steady state at the original operational mode. For example, a method of reducing output voltage transients in a voltage mode buck converter circuit comprises comparing a feedback signal from a feedback amplifier indicative of an output voltage for the voltage mode buck converter circuit to a reference signal to provide a comparison signal, sensing a load drop for the voltage mode buck converter circuit, storing a comparison signal value relating to the comparison signal at about a time of sensing the load drop, and locking the feedback amplifier to a signal responsive to the comparison signal value.

In another approach, a method of reducing output voltage transients in a voltage mode buck converter circuit comprises operating the voltage mode buck converter circuit in a continuous conduction operating condition including comparing a feedback signal from a feedback amplifier responsive to an output voltage for the voltage mode buck converter circuit to a reference signal to provide a comparison signal used at least in part to adjust the output voltage of the voltage mode buck converter circuit. The method also includes operating the voltage mode buck converter circuit in a non-continuous conduction mode including: storing a comparison signal value responsive to the comparison signal from the continuous conduction operating condition and clamping the feedback amplifier to a signal responsive to the comparison signal value. The method also includes transitioning to operating the voltage mode buck converter circuit in the continuous conduction operating condition including comparing the feedback signal indicative of the output voltage for the voltage mode buck converter circuit to the reference signal to at least in part adjust the output voltage of the voltage mode buck converter circuit.

So configured, the voltage control mode buck converter circuit experiences reduced voltage transients when switching between a non-conduction operation mode and a continuous conduction operation mode. By storing operation conditions during a continuous operation mode, the circuit can more quickly achieve steady-state operation when switching back to the continuous conduction operation mode from non-continuous conduction mode as opposed to starting with unusual operating conditions as may occur during the non-continuous operation mode. These and other benefits may become clearer upon making a thorough review and study of the following detailed description.

BRIEF DESCRIPTION OF THE DRAWINGS

The above needs are at least partially met through provision of the buck converter circuit voltage mode change circuit and method described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
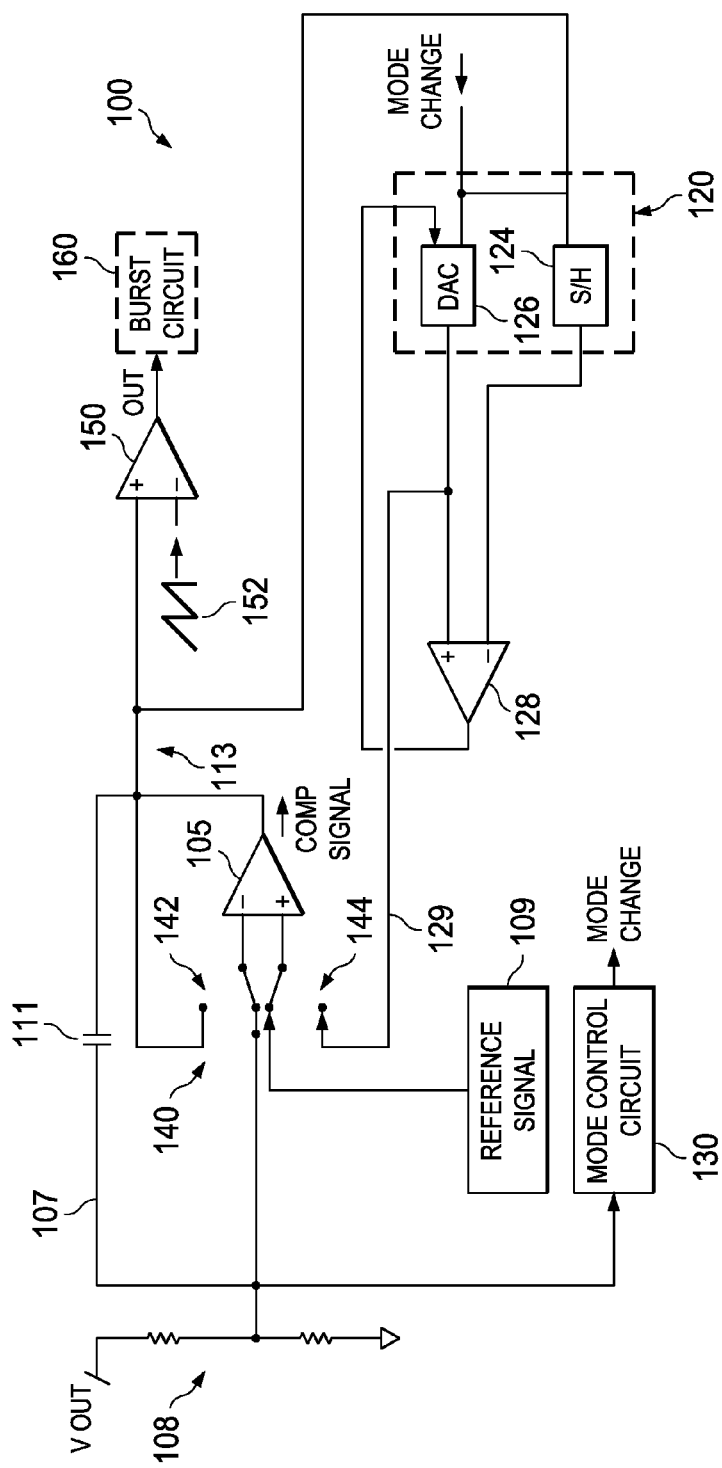
FIG. 1 comprises a circuit diagram of an example circuit configured in accordance with various embodiments of the invention.

Referring now to the drawings, and in particular to FIG. 1, an illustrative circuit that is compatible with many of these teachings will now be presented. The voltage control mode buck converter circuit 100 includes a feedback amplifier 105 that is configured to provide a comparison signal by comparing a feedback signal responsive to an output voltage for the circuit 100 to a reference signal when in a continuous conduction operation mode of the circuit 100. The converter circuit 100 also includes a storage circuit 120 in communication with the comparison signal from the feedback amplifier 105. The storage circuit 120 is configured to store a stored comparison signal value that is responsive to the comparison signal in association with an operation mode change for the circuit 100. The operation mode change for the circuit 100 occurs in association with detection of a load change on the output of the circuit 100. For example, the operation mode change typically includes converting from a continuous conduction operation mode to a non-continuous conduction operation mode when the circuit detects a load current drop on the output. The circuit 100 also includes a switching circuit 140 configured to switch the feedback amplifier 105 to be in communication with the signal responsive to the storage comparison signal value in association with detection of the load change for the circuit 100.

The feedback amplifier 105 of the converter circuit 100 provides a comparison signal by comparing a feedback signal to a reference signal. The feedback signal is provided to the feedback amplifier 105 on a feedback line 107. The feedback line 107 is in communication with a voltage that is related to the voltage output for the circuit 100. In the example of FIG. 1, the feedback line 107 connect through a voltage divider 108 connected to the circuit's 100 voltage output. The feedback signal is also in communication with the comparison signal via a capacitive network such as a capacitor element 111 as in FIG. 1, or a combination of capacitive and resistive elements. The reference signal is provided by a reference signal source 109, and the reference signal represents the target voltage signal output for the circuit 100.

The feedback amplifier 105 is configured to be disconnected from the feedback signal on the feedback line 107 and be connected in unity gain upon transition from the continuous conduction operation mode to a non-continuous conduction mode. In other words, when the circuit 100 enters a non-continuous operation mode, the output of the feedback amplifier 105 is connected to the input that is connected to the feedback line 107 during the continuous conduction operation mode. The feedback amplifier 105 is also configured to have a non-inverting input of the feedback amplifier 105 connected to receive the storage comparison signal in response to detection of the load change until a time after detection of the load change. Having the feedback amplifier 105 connected in unity gain and having the non-inverting input of the amplifier 105 connected to receive the stored comparison signal preserves the operation state (in this case, the comparison signal) for the circuit 100 prior to the circuit's 100 operation mode change, from continuous mode to non-continuous mode, while the voltage control mode buck converter circuit 100 is in a non-continuous conduction operation mode. When transitioning back to the continuous conduction operation mode, therefore, less of an adjustment will likely need to be made to reach steady state operation as compared to transitioning from an unlocked comparison signal voltage as may be present in the circuit 100 during a non-continuous conduction operation mode.

Another outcome of this configuration for the amplifier 105 in the non-continuous conduction operation mode is that the feedback signal for the amplifier 105 is substantially isolated from the amplifier 105 thus eliminating disturbance to the comparison signal. In various approaches, the external compensation network comprises the remaining circuitry of the circuit 100 that is used to operate as a converter circuit in conjunction with the amplifier 105. By so isolating the feedback amplifier 105 from the remainder of the circuit 100 when in a non-continuous conduction operation mode, the circuit 100 converts back to the continuous conduction operation mode with reduced voltage transients.

With continuing reference to FIG. 1, the storage circuit 120 is configured to continuously store a comparison signal value responsive to the comparison signal when the voltage control mode buck converter circuit 100 is the continuous conduction mode. By one approach, the storage circuit 120 includes a sample and hold circuit 124 in communication with the comparison signal. The sample and hold circuit 124 is configured to store the stored comparison signal value in response to the load drop event that triggers the transition from the continuous conduction operation mode to a non-continuous conduction operation mode. The storage circuit 120 also includes a digital to analog converter circuit 126 in communication with the sample and hold circuit 124. The digital to analog converter circuit 126 is configured to provide to the first amplifier 105 a signal corresponding to the continuous conduction comparison signal when the voltage control mode buck converter circuit 100 is in the non-continuous conduction operation mode. Sample and hold circuits and digital to analog converter circuits are generally known in the art and are readily adaptable to the applications described herein. By one approach, the sample and hold circuit 124 is connected to the comparison signal line 113 to continuously sense the comparison signal. Upon receiving an indication of a mode change from a continuous conduction operation mode to a non-continuous conduction operation mode, the sample and hold circuit 124 saves the most recent comparison signal from the continuous conduction operation mode. The sample and hold circuit 124 provides the stored comparison signal value to a second amplifier circuit 128 such that the output of the digital to analog converter circuit 126 can be compared to the value from the sample and hold circuit 124, thereby providing feedback to control the output of the digital to analog circuit 126. The digital to analog circuit 126 then provides this value responsive to the stored comparison signal value to the feedback amplifier 105 while operating in the non-continuous conduction operation mode.

Transitions between the continuous conduction operation mode and the non-continuous conduction operation mode are controlled by a mode control circuit 130. The mode control circuit 130 senses changes in the output load for the circuit 100. Should the mode control circuit 130 sense or detect certain load changes, the mode control circuit will send a signal to trigger a change in the operation mode for the circuit 100. The load change that triggers the operation mode change may be a drop in load current greater than a predetermined amount in a given time amount period or a drop in load current below a predetermined load current. Upon sensing the load drop, the mode control circuit 130 triggers the change of the voltage control mode buck converter circuit 100 from the continuous conduction mode to a non-continuous conduction efficiency savings mode to save energy when the circuit 100 need not provide an output continuously. The converter circuit 100 will then operate in a non-continuous conduction energy saving mode until the load for the circuit 100 returns to normal level or until prompted to convert back to a continuous conduction mode by a system controller. Therefore, the time after detection of a load change is the time needed for transition back to the continuous conduction mode, for example, when the load change triggering the operation mode change is removed from the voltage control mode buck converter circuit 100. At that time, the feedback amplifier 105 is reconfigured to operate in the continuous conduction operation mode.

The switching circuit 140 of the circuit 100 is configured to switch the configuration of the amplifier 105 during mode transitions between the continuous conduction operation mode and the non-continuous conduction operation mode in response to the load drop event and back again. In the example circuit 100 in FIG. 1, the switching circuit 140 includes two switches 142 and 144. The first switch 142 is configured to switch between the feedback line 107 and the comparison signal line 113 from the output of the feedback amplifier 105. The second switch 144 is configured to switch the non-inverting input of the feedback amplifier 105 between the reference signal of the reference signal source 109 and the line 129 providing a value responsive to the stored comparison signal value. The switches 142 and 144 are controlled in a known manner by a signal from the mode control circuit 130 such that the configuration of the switches 142 and 144 may be changed in response to operation mode changes for the circuit 100. For example, when in a non-continuous conduction mode, the switching circuit 140 is configured to switch the first amplifier 105 to be in unity gain whereby the comparison signal output of the feedback amplifier 105 is connected to the inverting input for the feedback amplifier 105, and the switching circuit 140 is configured to connect the non-inverting input of the amplifier 105 to be in communication with the signal responsive to the comparison signal as provided from the storage circuit 120. Upon receiving a signal from the mode control circuit 130 that the circuit 100 is switching from a non-continuous conduction operation mode to the continuous conduction operation mode, the switches 142 and 144 are actuated to connect the inverting input of the feedback amplifier 105 to the feedback signal line 107 and to connect the feedback amplifier 105 non-inverting input to the reference signal source 109.

With continuing reference to FIG. 1, the voltage control mode buck converter circuit 100 also may include a duty cycle comparator circuit 150 in communication with the comparison signal. The duty cycle comparator circuit 150 is configured to provide a switch signal that responds to the comparison signal wherein the switch signal determines at least in part the output voltage of the voltage control mode buck converter circuit 100, when the circuit 100 is in the continuous conduction operation mode. In the example of FIG. 1, the duty cycle comparator circuit 150 is an amplifier with one input connected to the comparison signal provided by the feedback amplifier 105 and the second input connected to a saw tooth signal 152. The output of the amplifier 150, therefore, is a switched signal such as a pulse width modulated signal. The pulse width modulated signal is then used by the system to provide the output for the converter circuit 100.

For example, when operating in a non-continuous conduction operation mode, the comparison signal is linked to the value responsive to the stored comparison signal value provided by the sample and hold circuit 124. This occurs because the value responsive to the stored comparison signal value is provided to the feedback amplifier 105 to lock the comparison signal to the stored comparison signal value when the circuit 100 is operating in a non-continuous conduction operation mode. Therefore, the output of the duty cycle comparator circuit 150, which is dependent in part on the comparison signal, is linked to the comparison signal during the non-continuous conduction operation mode. The output from the duty cycle comparator circuit 150 by one approach is then provided to a burst circuit 160 that may provide energy to the voltage control mode buck converter circuit 100 during the non-continuous conduction operation mode as needed.

So configured, the voltage control mode buck converter circuit 100 is able to store the operating conditions for the circuit prior to transition from the continuous conduction operation mode to a non-continuous conduction operation mode. The storage circuit 120 allows the storage of these conditions prior to the operation mode change. The circuit 100 is also able to transition back from a non-continuous conduction operation mode to a continuous conduction operation mode with reduced level output voltage transients through use of the switching circuit in communication with the feedback amplifier 105. The switching circuit allows the feedback amplifier 105 to be operating according to the continuous conduction mode conditions prior to the transition back to being in a continuous conduction operation mode such that there are reduced voltage swings in the circuit during the transition. For instance, in a typical voltage control mode buck converter circuit without such features, the voltage state of the comparison signal line 113 could vary significantly higher or significantly lower in response to variations in the feedback signal line 107 during non-continuous mode operation when the feedback amplifier 105 has been disconnected from the control loop. As such, upon transitioning back to continuous mode, and re-inserting the feedback amplifier 105 into the control loop, an undesirably large duty cycle variation will occur for a short period of time because the comparison signal 113 is not necessarily at its optimum control value, leading to an undesirably large transient on the output of the converter until the circuit regains steady state operation.

Figure 2:
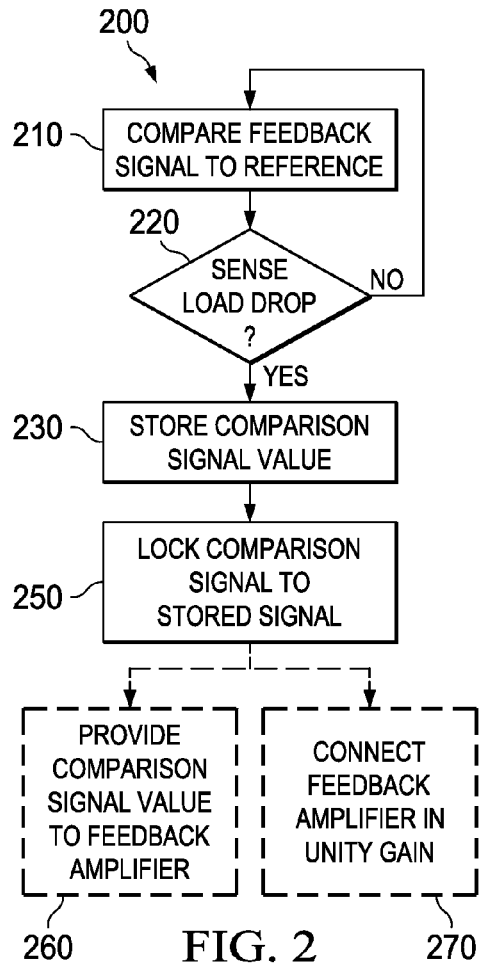
FIG. 2 comprises a flow diagram of an example method of operation configured in accordance with various embodiments of the invention.

A method of reducing output voltage transients in a voltage mode buck converter circuit 100 will be described with reference to FIG. 2. The method 200 includes the step 210 of comparing a feedback signal indicative of an output voltage for the voltage mode buck converter circuit 100 to a reference signal to provide a comparison signal. The circuit 100 senses at step 220 whether a load drop for the voltage mode buck converter circuit 100 occurs. Should a load drop not occur, the circuit 100 continues comparing the feedback signal to a reference signal. When a load drop is sensed, the circuit 100 at step 230 stores a comparison signal value relating to the comparison signal at about the time of sensing the load drop. The method 200 also includes locking comparison signal line 113 at step 250 to a signal responsive to the comparison signal of the feedback amplifier 105 during the continuous conduction mode. This step 250 of locking the comparison signal may include providing at step 260 a signal responsive to the comparison signal value to the feedback amplifier 105 from the voltage mode buck converter circuit 100. At step 270, the feedback amplifier 105 is connected in unity gain in response to sensing the load current drop. This method allows the circuit 100 to store and lock the operating conditions during the continuous conduction operation mode to reduce voltage transients during a transition from a non-continuous conduction operation mode.

Figure 3:
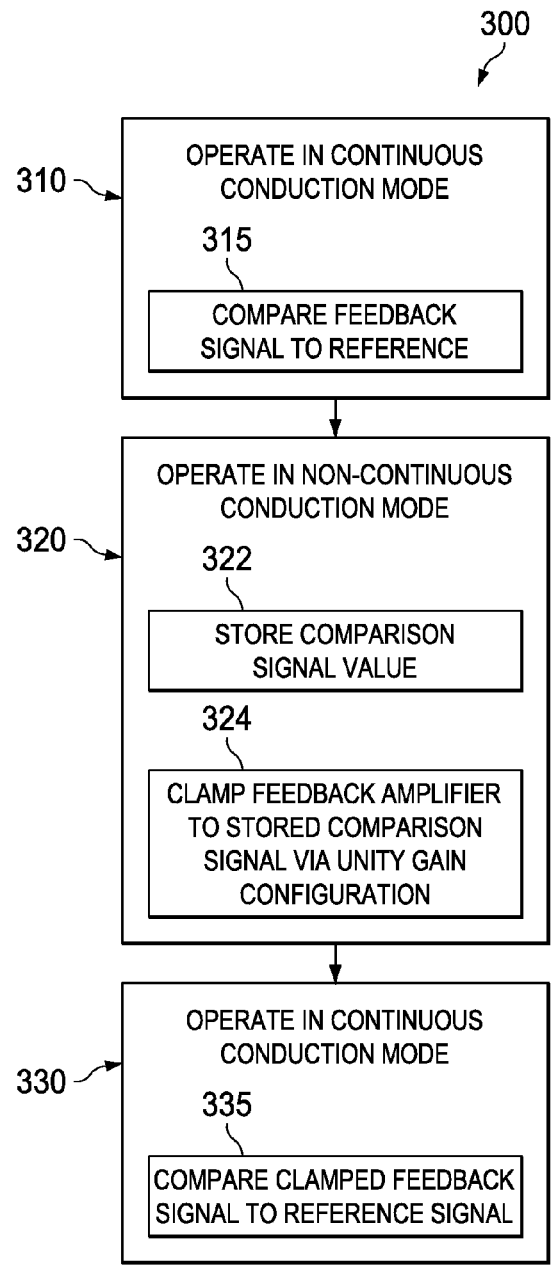
FIG. 3 comprises a flow diagram of steps taken during different operation modes of a circuit configured in accordance with various embodiments of the invention.

Operations of a voltage mode buck converter circuit 100 in the various operation modes will be described with reference to FIG. 3. At block 310, the voltage mode buck converter circuit 100 is operating in a continuous conduction operating mode including at step 315 comparing the feedback signal responsive to an output voltage for the circuit to a reference signal to provide a comparison signal used at least in part to adjust the output voltage of the voltage mode buck converter circuit 100. The circuit 100 transitions into operating in a non-continuous conduction mode at block 320 upon sensing a load drop. At step 322 upon entering the non-continuous conduction operation mode, a comparison signal value is stored responsive to the comparison signal from the continuous condition operating mode. At step 324, the feedback amplifier and comparison signal are clamped to the stored comparison signal by connecting the feedback amplifier in unity gain. When the load drop condition is removed or upon a signal from a control system, the circuit 100 transitions to operating in the continuous conduction operating mode of block 330. Upon this transition, the feedback signal, indicative of the output voltage for the circuit 100, is restored to its continuous mode configuration wherein it is compared at block 335 to the reference signal 109. However, by virtue of the comparison signal having been held at its proper operating condition, indicative of the appropriate duty cycle of the continuous mode throughout the non-continuous conduction mode, converter output voltage transients are reduced when the system is restored to the continuous conduction mode.

So configured, the voltage mode buck converter circuit may be configured to reduce voltage transients. For example, when transitioning from a non-continuous conduction mode back to a continuous conduction mode, the circuit restores quickly to continuous conduction steady state. By connecting a feedback amplifier to condition the comparison signal during non-continuous conduction mode, the circuit reduces output voltage transients at the transition to steady state continuous conduction mode.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A voltage control mode buck converter circuit comprising:
    a feedback amplifier configured to provide a comparison signal by comparing a feedback signal responsive to an output voltage for the voltage control mode buck converter circuit to a reference signal when in a continuous conduction operation mode of the voltage control mode buck converter circuit;

a storage circuit in communication with the comparison signal and configured to store a comparison signal value responsive to the comparison signal in association with an operation mode change for the voltage control mode buck converter circuit which occurs in association with detection of a load change on an output voltage of the voltage control mode buck converter circuit;

a switching circuit configured to switch the feedback amplifier to be in communication with a signal responsive to the stored comparison signal value in association with detection of the load change, wherein the feedback amplifier is further configured to be disconnected from the feedback signal and be connected in unity gain and having a non-inverting input of the feedback amplifier connected to receive the stored comparison signal in response to detection of the load change until a time after detection of the load change.

2. The voltage control mode buck converter circuit of claim 1 wherein the operation mode change comprises a change in the voltage control mode buck converter circuit from the continuous conduction mode to a non-continuous conduction efficiency savings mode.

3. The voltage control mode buck converter circuit of claim 1 wherein the load change comprises at least one of a group comprising a drop in load current greater than a predetermined amount in a given time period and a drop in load current below a predetermined load current.

4. The voltage control mode buck converter circuit of claim 1 wherein having the feedback amplifier connected in unity gain and having the non-inverting input of the feedback amplifier connected to receive the stored comparison signal preserves the comparison signal prior to the operation mode change while the voltage control mode buck converter circuit is in a non-continuous conduction operation mode.

5. The voltage control mode buck converter circuit of claim 4 further comprising a duty cycle comparator circuit in communication with the comparison signal, the duty cycle comparator circuit configured to provide a switched signal in response to the comparison signal wherein the switched signal determines at least in part the output voltage of the voltage control mode buck converter circuit when the voltage control mode buck converter circuit is in the continuous conduction operation mode, and the duty cycle comparator circuit being configured in combination with the storage circuit to provide switched signal information to a burst circuit when the voltage control mode buck converter circuit is in the non-continuous conduction operation mode.

6. The voltage control mode buck converter circuit of claim 1 wherein the time after detection of the load change comprises when the load change triggering the operation mode change is removed from the voltage control mode buck converter circuit whereby the feedback amplifier is reconfigured to operate in the continuous conduction operation mode.

7. A voltage control mode buck converter circuit comprising:
a feedback line in communication with an output voltage for the voltage control mode buck converter circuit;
a first amplifier configured to be in communication with the feedback line and a reference voltage during a continuous conduction operation mode for the voltage control mode buck converter circuit, the first amplifier configured to provide a comparison signal to a comparison line in response to a feedback signal on the feedback line and the reference voltage;
a storage circuit in communication with the comparison signal, the storage circuit configured to store a comparison signal value in association with the continuous conduction operation mode prior to a load current drop event;
the first amplifier configured to be in communication with a signal corresponding to the comparison signal value after a mode transition from the continuous conduction operation mode to a non-continuous conduction operation mode in response to the load current drop event.

8. The voltage control mode buck converter circuit of claim 7 wherein the storage circuit comprises a sample and hold circuit in communication with the comparison signal configured to store the stored comparison signal value in response to the load current drop event and a digital to analog converter circuit in communication with the sample and hold circuit and configured to provide to the first amplifier the signal corresponding to the comparison signal when the voltage control mode buck converter circuit is in the non-continuous conduction operation mode.

9. The voltage control mode buck converter circuit of claim 7 wherein the load current drop event comprises at least one of a group comprising a drop in load current greater than a predetermined amount in a given time period and a drop in load current below a predetermined load current.

10. The voltage control mode buck converter circuit of claim 7 wherein the first amplifier is configured to be disconnected from the feedback line and connected in unity gain and having a non-inverting input of the first amplifier connected to receive the stored comparison signal in response to the load current drop event.

11. The voltage control mode buck converter circuit of claim 10 wherein having the first amplifier connected in unity gain with the non-inverting input of the first amplifier connected to receive the stored comparison signal preserves the comparison signal prior to conversion of the voltage control mode buck converter circuit to the non-continuous conduction operation mode.

12. The voltage control mode buck converter circuit of claim 11 further comprising a duty cycle comparator circuit in communication with the comparison signal, the duty cycle comparator circuit configured to provide a switched signal in response to the comparison signal wherein the switched signal determines at least in part the output voltage of the voltage control mode buck converter circuit when the voltage control mode buck converter circuit is in the continuous conduction operation mode, and the duty cycle comparator circuit being configured in combination with the storage circuit to provide switched signal information to a burst circuit when the voltage control mode buck converter circuit is in the non-continuous conduction operation mode.

13. A voltage control mode buck converter circuit comprising:
a feedback line in communication with an output voltage for the voltage control mode buck converter circuit;
a first amplifier configured to be in communication with the feedback line and a reference voltage during a continuous conduction operation mode for the voltage control mode buck converter circuit, the first amplifier configured to provide a comparison signal to a comparison line in response to a feedback signal on the feedback line and the reference voltage;
a switching circuit configured to switch the first amplifier to be in unity gain and in communication with a signal responsive to the comparison signal, the switching circuit configured to switch during a mode transition from the continuous conduction operation mode to a non-continuous conduction operation mode in response to a load current drop event.

14. The voltage control mode buck converter circuit of claim 13 wherein having the first amplifier connected in unity gain and in communication with a signal responsive to the comparison signal preserves the comparison signal prior to the operation mode change while the voltage control mode buck converter circuit is in a non-continuous conduction operation mode such that when the voltage control mode buck converter circuit converts back to the continuous conduction operation mode output voltage transients are reduced in the voltage mode buck converter circuit.

15. The voltage control mode buck converter circuit of claim 14 further comprising a duty cycle comparator circuit in communication with the comparison signal, the duty cycle comparator circuit configured to provide a switched signal in response to the comparison signal wherein the switched signal determines at least in part the output voltage of the voltage control mode buck converter circuit when the voltage control mode buck converter circuit is in the continuous conduction operation mode, and the duty cycle comparator circuit being configured to provide switched signal information to a burst circuit when the voltage control mode buck converter circuit is in the non-continuous conduction operation mode.

16. The voltage control mode buck converter circuit of claim 13 wherein the switching circuit is further configured to switch the voltage control mode buck converter circuit to be connected according to the continuous conduction operation mode when the load current drop is removed from the voltage control mode buck converter circuit.

17. A method of reducing output voltage transients in a voltage mode buck converter circuit comprising:
comparing a feedback signal from a feedback amplifier indicative of an output voltage for the voltage mode buck converter circuit to a reference signal to provide a comparison signal;
sensing a load drop for the voltage mode buck converter circuit;
storing a comparison signal value relating to the comparison signal at about a time of sensing the load drop;
locking the feedback amplifier to a signal responsive to the comparison signal value; and
providing the signal responsive to the comparison signal value to a feedback amplifier of the voltage mode buck converter circuit and connecting the feedback amplifier in unity gain in response to sensing the load drop.

18. A method of reducing output voltage transients in a voltage mode buck converter circuit comprising:
operating the voltage mode buck converter circuit in a continuous conduction operating condition including comparing a feedback signal from a feedback amplifier responsive to an output voltage for the voltage mode buck converter circuit to a reference signal to provide a comparison signal used at least in part to adjust the output voltage of the voltage mode buck converter circuit;
operating the voltage mode buck converter circuit in a non-continuous conduction mode including:
storing a comparison signal value responsive to the comparison signal from the continuous conduction operating condition;
clamping the feedback amplifier to a signal responsive to the stored comparison signal value;
transitioning to operating the voltage mode buck converter circuit in the continuous conduction operating condition including comparing the feedback signal indicative of the output voltage for the voltage mode buck converter circuit to the reference signal to at least in part to adjust the output voltage of the voltage mode buck converter circuit, wherein the clamping and transitioning further comprises switching the feedback amplifier to be in communication with a signal responsive to the stored comparison signal value in association with detection of the load change, disconnecting the feedback amplifier from the feedback signal and connected in unity gain and connecting a non-inverting input of the feedback amplifier to receive the stored comparison signal in response to detection of the load change until a time after detection of the load change.

19. A voltage control mode buck converter circuit comprising:
a feedback amplifier configured to provide a comparison signal by comparing a feedback signal responsive to an output voltage for the voltage control mode buck converter circuit to a reference signal when in a continuous conduction operation mode of the voltage control mode buck converter circuit;
a storage circuit in communication with the comparison signal and configured to store a stored comparison signal value responsive to the comparison signal in association with an operation mode change for the voltage control mode buck converter circuit which occurs in association with detection of a load change on an output voltage of the voltage control mode buck converter circuit;
wherein the storage circuit is configured to continuously store a comparison signal value responsive to the comparison signal when the voltage control mode buck converter circuit is in the continuous conduction mode;
a switching circuit configured to switch the feedback amplifier to be in communication with a signal responsive to the stored comparison signal value in association with detection of the load change;
wherein the feedback amplifier is further configured to be disconnected from the feedback signal and be connected in unity gain and having a non-inverting input of the feedback amplifier connected to receive the stored comparison signal in response to detection of the load change until a time after detection of the load change;
wherein having the feedback amplifier connected in unity gain and having the non-inverting input of the feedback amplifier connected to receive the stored comparison signal preserves the comparison signal prior to the operation mode change while the voltage control mode buck converter circuit is in a non-continuous conduction operation mode.

* * * * *